(No Model.)
J. FLUREY & A. O'LEARY.
FEED TROUGH.
No. 485,580. Patented Nov. 1, 1892.
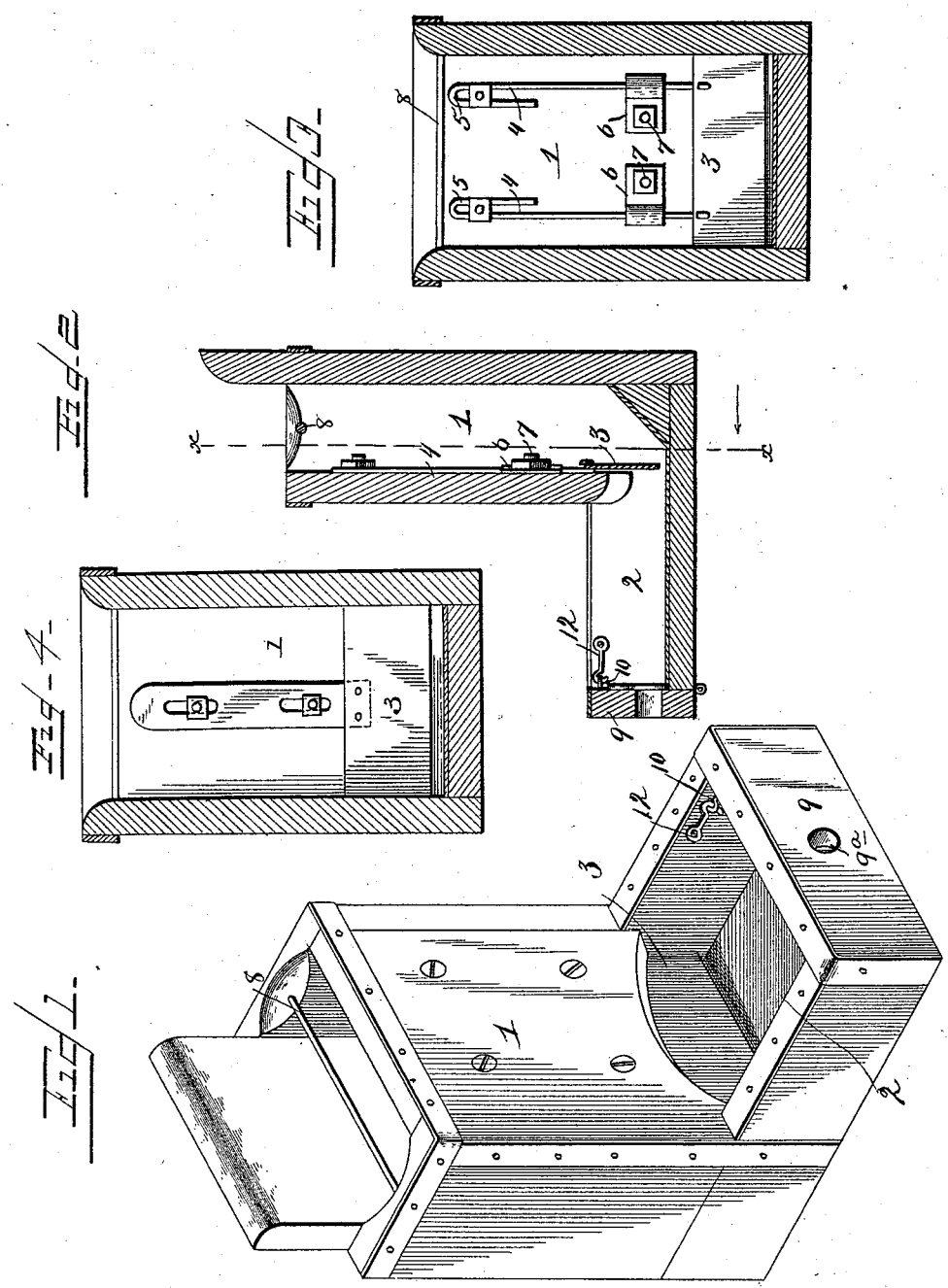
WITNESSES:
F. L. Durand
Jo. L. Coombs
INVENTORS:
James Flurey and
Arthur O'Leary,
by Saus Dagger & Co.
Attorneys.

United States Patent Office.

JAMES FLUREY AND ARTHUR O'LEARY, OF LINDSAY, CANADA; SAID O'LEARY ASSIGNOR TO JOHN CHARLES O'BRIEN.

FEED-TROUGH.

SPECIFICATION forming part of Letters Patent No. 485,580, dated November 1, 1892.

Application filed January 15, 1892. Serial No. 418,132. (No model.) Patented in Canada October 21, 1891, No. 37,653.

*To all whom it may concern:*

Be it known that we, JAMES FLUREY and ARTHUR O'LEARY, subjects of the Queen of Great Britain, and residents of Lindsay, in the Province of Ontario and Dominion of Canada, have invented certain new and useful Improvements in Feed-Boxes, (for which we have obtained Letters Patent of the Dominion of Canada, No. 37,653, dated October 21, 1891;) and we do hereby declare that the following is a full, clear, and exact description of the invention, which will enable others skilled in the art to which it appertains to make and use the same, reference being had to the accompanying drawings, which form a part of this specification.

Our invention relates to feed-boxes for horses and cattle, the object being to provide an improved construction of same whereby superior advantages are attained with respect to economy, simplicity, and efficiency.

The invention consists in the novel construction and combinations of parts hereinafter fully described and claimed.

In the accompanying drawings, Figure 1 is a perspective view of a feed-box constructed according to our invention. Fig. 2 is a central longitudinal section of the same. Fig. 3 is a cross-section on the line $xx$, Fig. 2. Fig. 4 is a view showing a modification of the means for operating the swinging gate.

In the said drawings, the reference-numeral 1 denotes a perpendicular box or receptacle for containing feed, connected at its lower end with the trough 2. The bottom of box 1 is made sloping or curved, so that the feed will be directed into the trough, the lower end of the front wall being cut away for that purpose.

The numeral 3 denotes a vertically-adjustable swinging gate for regulating the speed of the food fed to the trough or for shutting or cutting off the supply entirely, as may be desired. This gate is hinged or pivotally connected with two rods 4, the upper ends of which are bent downwardly, forming hooks or loops 5, which embrace screw-threaded studs 6, secured to the front wall of box 1 and provided with nuts 7.

At the upper end of the box 1 is a transverse rod 8 to prevent access of horses or cattle thereto. The bottom of the trough 2 is covered with sheet metal, and the edges of the front and side walls are provided with metal protecting-strips to prevent cribbing. The front wall 9 of the trough is hinged to the bottom thereof, forming a door which may be let down for the purpose of cleaning the trough, and is provided with eyes or loops 10, with which engage hooks 12 for fastening the door when shut. It is also provided with an opening $9^a$.

The food is placed in the box 1, and by reason of the sloping wall is directed into the trough, the speed at which the food is fed being regulated or shut off entirely by the adjustable gate.

In the modification shown in Fig. 4 the rods 4 are dispensed with and a single plate substituted therefor having elongated slots in which work the headed bolts.

It is obvious that the rods 4 may be joined together at their upper ends and only one nut and stud employed without departing from the invention.

By means of the adjustable gate the grain can be fed gradually and in small quantities, whereby the horse is prevented from eating too fast and bolting his food.

We are aware that it is not broadly new to provide a feed-trough with a vertically-adjustable slide for regulating the flow of feed into a trough; also that a swinging gate for the same purpose is not new, and such are not claimed by us, our invention being restricted to a vertically-adjustable slide provided with a swinging gate at its lower end.

Having thus described our invention, what we claim is—

1. In a feed-box, the combination, with the food-receptacle having a sloping bottom and an open front, of the trough and the vertically-adjustable slide located inside of the food-receptacle, provided at its lower end with a swinging gate, substantially as described.

2. In a feed-box, the combination, with the food-receptacle having a sloping bottom and an open front, of the feed-trough, the vertically-adjustable rods having their upper ends bent over, forming loops, the screw-threaded studs, the nuts, and the gate pivotally connected with said rods, substantially as described.

3. In a feed-box, the combination, with the food-receptacle having a sloping bottom and an open front, and the vertically-adjustable swinging gate, of the feed-trough having a hinged door at its front, substantially as described.

In testimony that we claim the foregoing as our own we have hereunto affixed our signatures in presence of two witnesses.

JAMES FLUREY.
ARTHUR O'LEARY.

Witnesses:
GEORGE McHUGH,
THOMAS BELL.